(12) United States Patent
Bortnyk

(10) Patent No.: US 6,801,867 B2
(45) Date of Patent: Oct. 5, 2004

(54) COMBINING SIGNAL IMAGES IN ACCORDANCE WITH SIGNAL-TO-NOISE RATIOS

(75) Inventor: George P. Bortnyk, Seminole, FL (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/219,128

(22) Filed: Aug. 15, 2002

(65) Prior Publication Data

US 2003/0040880 A1 Feb. 27, 2003

Related U.S. Application Data

(60) Provisional application No. 60/312,426, filed on Aug. 15, 2001.

(51) Int. Cl.[7] ............................................. G01R 35/00
(52) U.S. Cl. ........................ 702/107; 382/100; 348/614
(53) Field of Search .............................. 702/72–74, 81, 702/86, 107, 111, 123, 173; 382/100, 232, 254; 348/254, 625, 614, 630; 356/479; 324/307, 309

(56) References Cited

U.S. PATENT DOCUMENTS

| 4,006,421 | A | | 2/1977 | Mermoz ...................... 325/474 |
| 4,314,277 | A | * | 2/1982 | Pritchard et al. ........... 348/614 |
| 4,805,229 | A | | 2/1989 | Mobley ....................... 455/138 |
| 5,184,134 | A | * | 2/1993 | Niho et al. .................... 342/25 |
| 5,399,970 | A | * | 3/1995 | Pelc et al. ................... 324/309 |
| 6,456,608 | B1 | | 9/2002 | Lomp .......................... 370/335 |
| 6,463,295 | B1 | * | 10/2002 | Yun ............................. 455/522 |

FOREIGN PATENT DOCUMENTS

| EP | 0 430 481 A2 | 6/1991 | ............ H04B/7/08 |
| EP | 0 661 834 A2 | 12/1994 | ............ H04B/7/08 |
| FR | 2 275 076 | 1/1976 | ............ H04B/7/08 |
| JP | 3-239019 | 10/1991 | ............ H04B/7/06 |
| SU | 1587651 A1 | 8/1990 | ............ H04B/7/08 |
| WO | WO 98/32243 | 7/1998 | ............ H04B/7/08 |
| WO | WO 01/80506 A2 | 10/2001 | ............ H04L/23/02 |

OTHER PUBLICATIONS

UK Patent Office Search Report dated Jul. 16, 2003 for Application No. GB 0301193.9 filed Jan. 20, 2003.
UK Patent Office Search Report dated Jul. 17, 2003 for Application No. GB 0301193.9 filed Jan. 20, 2003.
Halpern, S.W., "The Theory of Operation of an Equal–Gain Predetection Regenerative Diversity Combiner with Rayleigh Fading Channels", IEEE Transactions on Communications, vol. Com–22, No. 8, pp. 1099–1106.
Halpern, Samuel W., "The Effect of Having Unequal Branch Gains in Practical Predetection Diversity Systems for Mobile Radio", IEEE Transactions on Vehicular Technology, vol. VT–26, No. 1, pp. 94–105.
Edwards, Arthur E., "Rapid Fading Effects on Airborne Satellite Communication Receivers Employing Granlund Pre–Detection Diversity Combiners", Conference Record vol. 3 of 3, Sponsored by IEEE Communications Society and Armed Forces Communications and Electronics Association, D–7803–2489–7/95 © 1995 IEEE, cover and pp. 1013–1020.

(List continued on next page.)

Primary Examiner—Marc S. Hoff
Assistant Examiner—Mohamed Charioui
(74) Attorney, Agent, or Firm—Baker Botts L.L.P.

(57) ABSTRACT

Combining signal images includes receiving signal images and performing the following to yield a weighted sum for at least one signal image. A phasor is generated from a signal image in accordance with a correlation reference, and a phase alignment of the signal image is adjusted to yield an adjusted signal image. A signal magnitude estimate is determined in accordance with the phasor, and a weight is determined in accordance with the signal magnitude estimate, where the weight reflects a signal-to-noise ratio of the signal image. The weight is applied to the adjusted signal image to yield a weighted sum for the signal image. The weighted sums are combined to yield a combined signal output.

18 Claims, 5 Drawing Sheets

OTHER PUBLICATIONS

Edwards, Arthur E., et al., "*Loss of Phase Coherence in Granlund Pre–Detection Diversity Combiners*", MILCOM 96 Conference Proceedings, vol. 3 of 3, Sponsored by IEEE Communications Society and the Armed Forces Communications and Electronics Associations, D–7803–3682–8/96 © 1996, cover and pp. 791–795.

Kostek, Stephen and Franke, Ernie, "*Common Integrated Broadcast Service–Modules (CIBS–M) to Expand the Joint Tactical Terminal (JTT) Family*", MILCOM 1999 Conference Proceedings, vol. 1, Sponsored by IEEE Communications Society and Armed Forces Communications and Electronics Association, D–7803–5538–5/99 © 1999, cover and pp. 591–597.

* cited by examiner

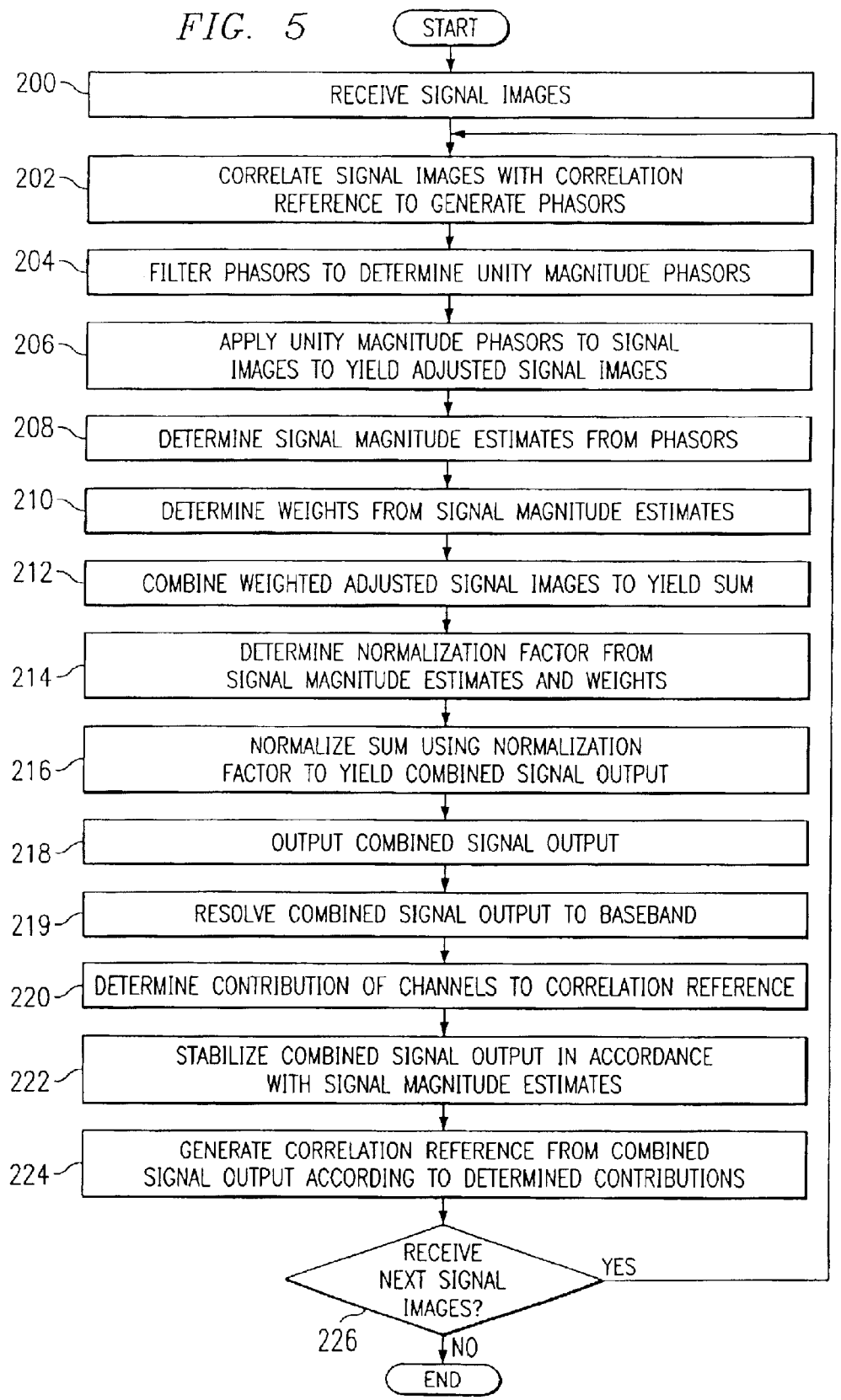

## COMBINING SIGNAL IMAGES IN ACCORDANCE WITH SIGNAL-TO-NOISE RATIOS

RELATED APPLICATIONS

This application claims benefit under U.S.C. § 119(e) of U.S. Provisional Application Ser. No. 60/312,426 filed Aug. 15, 2001, entitled, "QUAD DIVERSITY SIGNAL IMAGE COMBINING."GOVERNMENT FUNDING The U.S. Government may have certain rights in this invention as provided for by the terms of Grant No. DAAB07-97-C-J437, JTT CIBS-M awarded by CECOM, U.S. Army.

TECHNICAL FIELD OF THE INVENTION

This invention relates generally to communications systems, and more specifically to combining signal images in accordance with signal-to-noise ratios.

BACKGROUND OF THE INVENTION

Signal images from multiple receivers may be combined to determine content included in the signal images. Known techniques for signal combining, however, may require strict gain and noise conditions. For example, the Granlund technique requires signal images with matched gain and noise in order to optimally combine the signal images. Consequently, known techniques for signal combining are unsatisfactory for many needs.

SUMMARY OF THE INVENTION

In accordance with the present invention, disadvantages and problems associated with previous techniques for combining signal images may be reduced or eliminated.

According to one embodiment of the present invention, combining signal images includes receiving signal images and performing the following to yield a weighted sum for at least one signal image. A phasor is generated from a signal image in accordance with a correlation reference, and a phase alignment of the signal image is adjusted to yield an adjusted signal image. A signal magnitude estimate is determined in accordance with the phasor, and a weight is determined in accordance with the signal magnitude estimate, where the weight reflects a signal-to-noise ratio of the signal image. The weight is applied to the adjusted signal image to yield a weighted sum for the signal image. The weighted sums are combined to yield a combined signal output.

Certain embodiments of the invention may provide one or more technical advantages. A technical advantage of one embodiment may be that signal images are combined in accordance with the signal-to-noise ratios associated with at least one signal image, such that maximal ratio combining gain may be substantially realized. Accordingly, receiver amplifiers are not required to be matched with respect to gain and noise figure in order to optimally combine the signal images.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and the advantages thereof, reference is now made to the following description taken in conjunction with the accompanying drawings.

FIG. 5 is a flowchart illustrating one embodiment of a method for combining signals.

DETAILED DESCRIPTION OF THE DRAWINGS

The invention and its advantages are best understood by referring to FIGS. 1–5 of the drawings, like numerals being used for like and corresponding parts of the various drawings.

Figure 1:
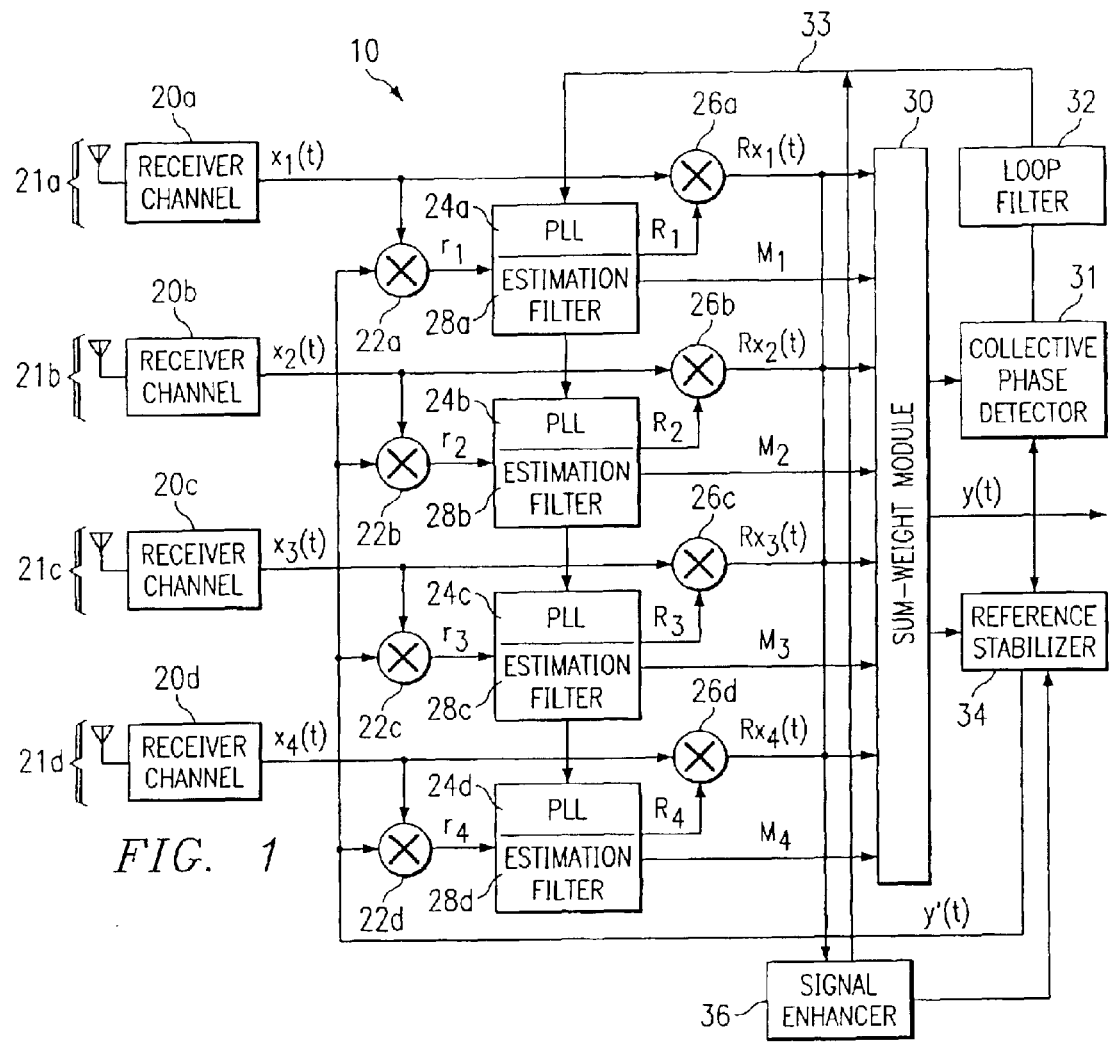
FIG. 1 is a block diagram of one embodiment of a system for combining signals.

FIG. 1 is a block diagram of one embodiment of a system 10 for combining signals. System 10 combines signal images in accordance with signal-to-noise ratios associated with each signal image. Accordingly, receiver amplifiers that may amplify the signal images are not required to be matched with respect to gain and noise figure in order to substantially optimally combine the signal images.

In general, system 10 correlates signal images $x_i(t)$ with a correlation reference $y'(t)$ to yield phasors $r_i$, and generates signal magnitude estimates $M_i$ from the phasors $r_i$. Weights $W_i$ of signal images $x_i(t)$ are determined from the signal magnitude estimates $M_i$, where $M_i$ are derived from phasors $r_i$.

Each weight $W_i$ reflects the signal-to-noise ratio associated with the corresponding signal image $x_i(t)$, allowing system 10 to avoid the requirement that receiver amplifiers used to amplify signal images $x_i(t)$ must be matched with respect to gain and noise figure. "Each" as used in this document refers to each member of a set or each member of a subset of the set. The phase of unity magnitude phasors $R_i$ that substantially match, or track, the phase of phasors $r_i$ are applied to signal images $x_i(t)$ to yield phase-aligned signal images $Rx_i(t)$ that are substantially phase aligned.

Weights $W_i$ are applied to phase-aligned signal images $Rx_i(t)$ to yield weighted phase-aligned signal images $WRx_i(t)$, such that the weighted phase-aligned signal images have substantially the same phase. System 10 adds the weighted phase-aligned signal images $WRx_i(t)$, and normalizes the result to generate a combined signal output $y(t)$, which is modified to generate correlation reference $y'(t)$.

According to one embodiment, system 10 comprises channels 21a–d that include receiver channels 20a–d that receive and process signals to yield signal images $x_i(t)$. Multipliers 22a–d correlate signal images $x_i(t)$ with a correlation reference $y'(t)$ to yield phasors $r_i$. Phase-locked loop (PLL) circuits 24a–d perform tracking filtering to yield unity magnitude phasors $R_i$ having frequencies that match phasors $r_i$ and having phases that match, or track, those of corresponding phasors $r_i$. Multipliers 26a–d apply unity magnitude phasors $R_i$ to signal images $x_i(t)$, thereby possibly adjusting the frequencies and phases of signal images $x_i(t)$ to yield phase-aligned signal images $Rx_i(t)$.

Estimation filters 28a–d generate signal magnitude estimates $M_i$ from phasors $r_i$. Signal magnitude estimates $M_i$ provide an estimate of the signal content of signal images $x_i(t)$. A sum-weight module 30 determines weights $W_i$ applicable to signal images $x_i(t)$ from signal magnitude estimates $M_i$. Each weight $W_i$ reflects the signal-to-noise ratio associated with the corresponding signal image $x_i(t)$, allowing system 10 to avoid the requirement that receiver amplifiers of receiver channels 20a–d must be matched with respect to gain and noise figure. Within sum-weight module 30, weights $W_i$ are applied to phase-aligned signal images $Rx_i(t)$ to yield weighted phase-aligned signal images $WRx_i(t)$. Sum-weight module 30 combines the weighted phase-aligned signal images $WRx_i(t)$ and normalizes the result to generate the combined signal output y(t), which is modified by a reference stabilizer 34 to yield correlation reference y'(t).

A carrier recovery loop 33 drives phase-locked loop circuits 24a–d to resolve the combined signal output y(t) and the correlation reference y'(t) to baseband. Carrier recovery loop 33 includes a phase detector 31 and loop filter 32 that derive a phase error measurement, which may be simultaneously applied to phase-locked loop circuit 24. Reference stabilizer 34 conditions correlation reference y'(t) to avoid noise-cross-noise latch-up. Reference stabilizer 34 is described in more detail with references to FIG. 3. A signal enhancer 36 allows system 10 to acquire a signal from one of the channels 21a–d, when there is substantially no signal energy at the other channels 21a–d. Signal enhancer 36 is described in more detail with references to FIG. 4.

System 10 may include more or fewer components. For example, carrier recovery loop 33 may be omitted and the carrier recovery process may be performed independently of system 10. Signal enhancer 36 may be omitted if, for example, two or more of channels 21a–d have adequate signal-to-noise ratio. Reference stabilizer 34 may be omitted if sufficient signal-to-noise ratio exists in channels 21a–d to substantially preclude the noise-cross-noise instability. Other omissions, additions, and modifications may be performed on system 10 without departing from the scope of the invention.

System 10 may approximate maximal ratio combining. It is, however, within the scope of the invention to include non-optimal weighting that may result from, for example, employing a non-optimal weight calculator. System 10 may include other compromises to optimal performance resulting from, for example, stability enhancement or single signal enhancement.

System 10 has broad applications where signal images are combined. For example, system 10 may be used for land or sea mobile platforms where fading or signal blockages may occur and degrade signal-to-noise ratio in channels 21a–d. In addition, system 10 may be used to combat signal fading or signal blockages caused by airframe structures during the roll, pitch, and yaw of aircraft, where the structures block the path of the signal. Additionally, system 10 may be used in satellite communications (SATCOM) for combating multipath fading and low antenna gain. The embodiment may be used to combine signals transmitted through acoustic media such as air, water, or other fluids or gasses, and may be used to combine signals propagating through solids, including seismic waves or signals propagating through in the earth. Application of the invention, however, is not limited to the specific systems or uses mentioned.

Figure 2A:
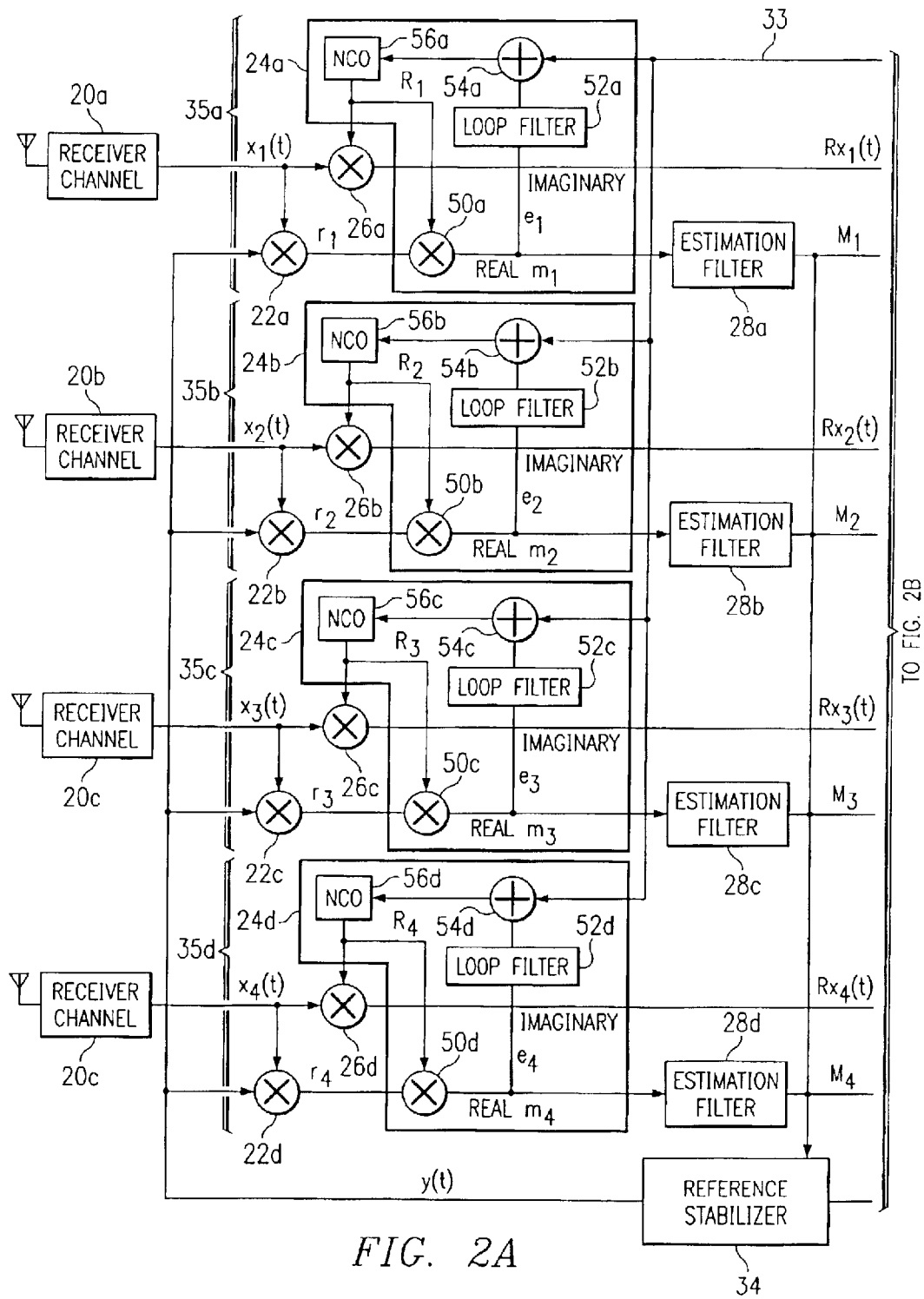
FIGS. 2A and 2B are a block diagrams of a more detailed view of the embodiment of the system of FIG. 1.
Figure 2B:
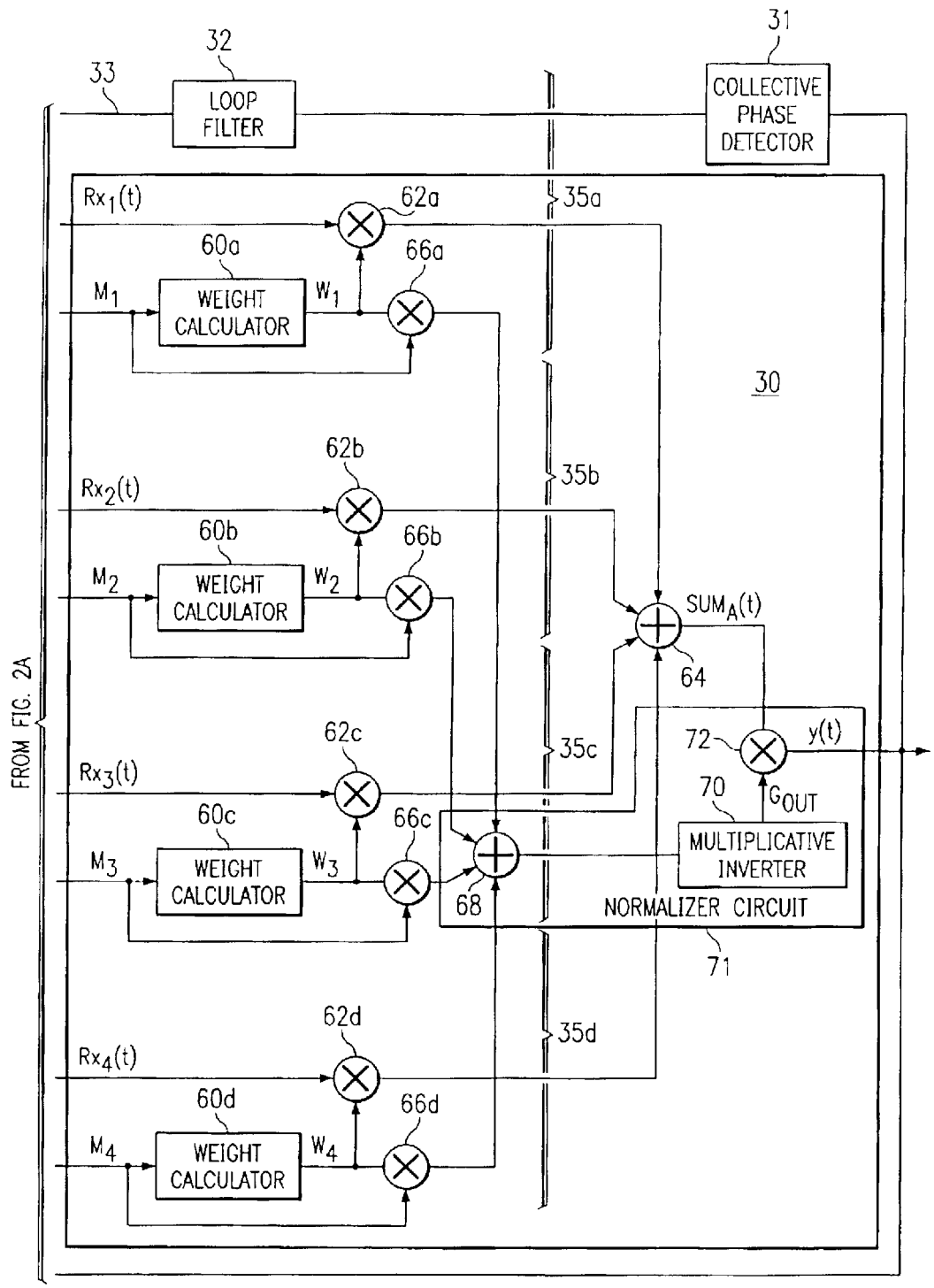

FIGS. 2A and 2B is a block diagram of a more detailed embodiment of system 10 of FIG. 1. According to the embodiment of FIGS. 2A and 2B, system 10 includes channels 21a–d that receive and process signals. Although system 10 is illustrated with four channels 21, system 10 may include two or more channels 21a–d without departing from the scope of the invention.

Receiver channels 20a–d receive signals that are sampled as signal images $x_i(t)$ defined by Equation (1):

$$x_i(t) = \alpha_i d(t) + n_i(t) \qquad (1)$$

where i corresponds to a channel 21, d(t) represents a signal, $\alpha_i$ represents a complex branch gain, and $n_i(t)$ represents noise, where each noise term $n_i(t)$ is mutually uncorrelated and uncorrelated relative to the signal d(t). Signal d(t) may comprise a phase-shift keying (PSK) signal, and noise $n_i(t)$ may comprise additive white Gaussian noise (AWGN). A receiver channel 20a–d may have independent automatic gain control (AGC), thereby possible providing for the less restrictive dependence on matched receiver gain and noise figure. The independent automatic gain control may maintain a signal S and a noise N according to, for example, $C = (S^2 + N^2)^{1/2}$, where C is a constant.

The illustrated embodiment is described using PSK modulation and AWGN, where the condition of noise in each channel 21a–d is mutually uncorrelated and each branch noise process is uncorrelated with the signal d(t). The embodiment, however, performs signal combining with various modulation formats, in noise conditions other than AWGN, and where noise may not be strictly uncorrelated as described above. Therefore, it is intended that the scope of this invention encompass the signal, modulation, and noise variations familiar to those skilled in the art.

Each channel 21a–d has a channel branch 35a–d that receives signal images $x_i(t)$ and outputs weighted phase-aligned signal images $WRx_i(t)$. Each channel branch 35a–d includes a complex multiplier 22a–d, a phase-locked loop circuit 24a–d, an estimation filter 28a–d, a weight calculator 60a–d, and a scalar multiplier 62a–d. Complex multipliers 22a–d correlate signal images $x_i(t)$ with a correlation reference y'(t) to yield phasors $r_i$. Correlation reference y'(t) is generated from a combined signal output y(t), which has been modified by reference stabilizer 34. An expression for combined signal output y(t), which may substantially represent correlation reference y'(t), may be given by Equation (2):

$$y(t) = \frac{1}{\sum_i W_i M_i} \sum_i [W_i |\alpha_i| d^*(t) + W_i R_i^* n_i^*(t)] \qquad (2)$$

The correlation of signal images $x_i(t)$ with the correlation reference y'(t) may remove modulation, since $d^*(t)d(t)=1$.

Phase-locked loop circuits 24a–d perform tracking filtering to yield known magnitude phasors $R_i$ having frequencies and phases that match the frequencies of phasors $r_i$ or track the phases of phasors $r_i$. A phase-locked loop circuit 24a–d may comprise a complex multiplier 50a–d, a numerically controlled oscillator (NCO) 56a–d, and a loop filter 54a–d. Complex multiplier 50a–d correlates unity magnitude phasor $R_i$ with phasor $r_i$ to drive the imaginary component $e_i$ of phasor $r_i$ to zero and to resolve the real component $m_i$ of phasor $r_i$. The imaginary component $e_i$ represents phase error in a corresponding phase-locked loop circuit 24a–d, relative to the established phase of the other phase-locked loop circuits 24a–d. The imaginary component $e_i$ is used to produce a phase error drive for phase-locked loop circuit 24a–d such that mutual phased-lock loop dynamics converge to and maintain mutual phase alignment of adjusted signal images $Rx_i(t)$. The real component may be used to represent the magnitude of phasor $r_i$, tracking the magnitude of the signal content $\alpha_i d(t)$ embedded in signal image $x_i(t)$.

According to one embodiment, a numerically controlled oscillator (NCO) 56a–d comprises a perfect integrator coupled to a complex sinusoid generator such that the NCO's 56a–d output frequency is proportional to the input drive. The NCO's 56a–d frequency F may be precisely known given the following expression, where k is the gain coefficient and v is the input drive.

$$F = kv$$

According to the embodiment, a loop filter 52a–d comprises an imperfect integrator and a feed-forward path. A loop filter 52a–d, along with an NCO 56a–d, determines the type of phase-locked loop realized. According to the embodiment discussed here, a Type-I, second order control loop is realized. System 10, however, may use higher and lower order phase-locked loops while remaining within the scope of the invention. Various changes and modifications to NCOs 56a–d and loop filters 52a–d that affect the type and order of the loop may be suggested to one skilled in the art.

Complex multipliers 26a–d apply unity magnitude phasors $R_i$ to signal images $x_i(t)$, adjusting the phase alignment of $\alpha_i d(t)$ embedded in $x_i(t)$, to yield adjusted signal images $Rx_i(t)$. The signal images are phase alignment is adjusted to support phase coherent constructive addition to generate combined signal output y(t).

Figure 3:
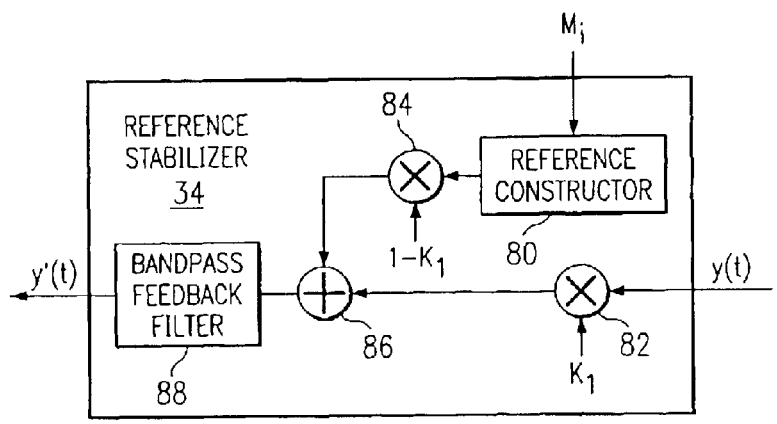
FIG. 3 is a block diagram illustrating one embodiment of the reference stabilizer of FIG. 1.

Estimation filters 28a–d generate signal magnitude estimates $M_i$ from real components $m_i$. An estimation filter 28a–d may comprise, for example, a narrow low pass filter to reduce the variance of the estimate. A real component $m_i$ may be based on the stationary ergodic processes of signal image $x_i(t)$, so the signal magnitude estimate $M_i$ may provide an accurate estimate of the signal content $|\alpha_i d(t)|$ of signal image $x_i(t)$. Expressions (3) through (6) provide an explanation of the estimation process for determining signal magnitude estimate $M_i$. Expressions (3) through (6) assume that coefficient $K_1$ in FIG. 3 is set to a value close to unity, such that correlation reference y'(t) substantially comprises combined signal output y(t).

Equation (3) defines phasor $r_i$:

$$r_1 = x_1(t)y(t) = [\alpha_1 d(t) + n_1(t)] \left[ \frac{\sum_i [W_i|\alpha_i|d^*(t) + W_i R_i^* n_i^*(t)]}{\sum_i W_i M_i} \right] \quad (3)$$

Expanding Equation (3) yields Equation (4):

$$r_1 = \alpha_1 d(t) d^*(t) \frac{1}{\sum_i W_i M_i} \sum_i W_i|\alpha_i| + \alpha_1 d(t) \frac{1}{\sum_i W_i M_i} \sum_i W_i R_i^* n_i^*(t) + \quad (4)$$

$$n_1(t) \frac{1}{\sum_i W_i M_i} d^*(t) \sum_i W_i|\alpha_i| + n_1(t) \frac{1}{\sum_i W_i M_i} \sum_i W_i R_i^* n_i^*(t)$$

The uncorrelated terms in Equation (4) average to zero in estimation filter 28, resulting in the following relationship described by Equation (5):

$$M_1 \cong E[m_1] \cong E[|r_1|] \cong |\alpha_1| + \frac{W_1}{\sum_i W_i M_i} n_1(t) R_1^* n_1^*(t) \quad (5)$$

If the signal-to-noise ratio is high, the noise component $n_1(t)$ is low, and if the signal-to-noise ratio is low, weight $W_1$ is very low. In either situation, the noise-cross-noise term is sufficiently small to substantially ignore. Therefore, the signal magnitude estimates $M_i$ may be described by Equation (6).

$$M_1 \cong |\alpha_1 d(t)|, \text{ or generally } M_i \cong |\alpha_i d(t)| \quad (6)$$

Weight calculators 60a–d calculate weights $W_i$ from signal magnitude estimates $M_i$. According to classical theory, maximal-ratio combining requires that signal images $x_i(t)$ be weighted in accordance with $S/N^2$ and that $\{E[|x_i(t)|]\} = C$ is maintained by the automatic gain control. Accordingly, $E[n_1^2(t)] = C^2 - M_1^2$. As a result, in general the weights $W_i$ may given by Equation (7):

$$W_i = \frac{M_i}{C^2 - M_i^2} \quad (7)$$

Scalar multipliers 62a–d apply weights $W_i$ to adjusted signal images $Rx_i(t)$ to generate weighted adjusted signal images $WRx_i(t)$. A summing node 64 combines the weighted adjusted signal images $WRx_i(t)$ to yield weighted sum $Sum_A(t)$. The signal component of weighted sum $Sum_A(t)$ may be defined by Equation (8):

$$\left| \sum_i W_i R_i \alpha_i d(t) \right| = \sum_i W_i M_i \quad (8)$$

Multipliers 66a–d apply weights $W_i$ to signal magnitude estimates $M_i$ to yield weighted signal magnitude estimates $WM_i$. A normalizer circuit 71 substantially maintains the embedded signal energy of correlation reference y'(t) at unity. Normalizer circuit 71 comprises an adder 68, a multiplicative inverter 70, and a dual scalar multiplier 72. Summing node 68 combines the weighted signal magnitude estimates $WM_i$. Multiplicative inverter 70 inverts the combined weighted signal magnitude estimates $WM_i$ to yield a normalization factor $G_{out}$, as may be defined by Equation (9):

$$G_{out} = \frac{1}{\sum_i W_i M_i} \quad (9)$$

Multiplier 72 normalizes signal component of weighted sum $Sum_A(t)$ to unity by applying normalization factor $G_{out}$ to weighted sum $Sum_A(t)$. In the final expression, $|R\alpha_i| = |\alpha_i|$, and combined signal output y(t) may be described by Equation (10):

$$y(t) = \frac{\sum_i W_i R_i x_i(t)}{\sum_i W_i M_i} = \frac{1}{\sum_i W_i M_i} \sum_i [W_i|\alpha_i|d^*(t) + W_i R_i n_i^*(t)]. \quad (10)$$

Carrier recovery loop 33 drives phase-locked loop circuits 24a–d to resolve the combined signal output y(t) to baseband, that is, zero frequency error. Carrier recovery loop 33 includes a phase detector 31 and a loop filter 32 that derive a phase error measurement, which may be applied to phase-locked loop circuits 24a–d. Carrier recovery loop 33 may have, for example, a second order Type-II topology. Carrier recovery loop 33 resolves the signal output y(t) to baseband after mutual phase alignment has been achieved, and thus may benefit from signal-to-noise ratio improvement.

System 10 of FIGS. 2A and 2B may include more or fewer modules. For example, a carrier recovery loop may be employed outside of system 10, such that carrier recovery loop 33 may be omitted. Carrier recovery loop 33 is not required to achieve phase alignment of signal images $x_i(t)$, estimation of signal magnitude estimates $M_i$, determination of weights $W_i$, or normalization.

The carrier recovery loop may employ a variety of loop filter topologies and other components that realize a type and order of loop different from the Type-II, second order loop described in this embodiment. It is intended that these different options of type and order of carrier recovery loop be encompassed by the current invention.

FIG. 3 is a block diagram illustrating one embodiment of reference stabilizer 34 of FIG. 1. Reference stabilizer 34 stabilizes correlation reference y'(t) in order to reduce the occurrence of noise-cross-noise latch-up that may occur with signal images $x_j(t)$ having low signal-to-noise ratios where the following dynamic behavior occurs. A signal image $x_j(t)$ with a low signal-to-noise ratio may have a higher than actual signal magnitude estimate $M_j$, due to normal variances in the estimation process, thereby possibly causing signal image $x_j(t)$ to begin to dominate the correlation reference y'(t). The domination may cause the noise component of $x_j(t)$ to subsequently correlate increasingly with itself in correlation reference y'(t), which may result in positive feedback that maximizes weight $W_j$, while minimizing the other weights $W_i$. This state sustains itself, precluding the procedure from actively estimating and weighting signals $x_i(t)$. Reference stabilizer 34 substantially prevents this latched state from occurring.

Reference stabilizer 34 includes a reference constructor 80, multipliers 82 and 84, a summing node 86, and a bandpass feedback filter 86. Multiplier 82 combines signal output y(t) with a constant $K_1$. According to the illustrated embodiment, $K_1$ is set to near zero, such that the correlation reference y'(t) is generated using mainly a contribution from reference constructor 80. An optimization process, however, may be used to set $K_1$, where $0<K_1<1$, such that the correlation reference y'(t) is made from substantial contributions from the combined signal output y(t) and from reference constructor 80. Reference constructor 80 receives and combines magnitude estimates $M_1$ adjusted with respect to a compensation function P(M).

Reference constructor 80 combines aligned signal images $Rx_i(t)$ with equal weighting, thereby decoupling the reference construction from the signal estimation process. The decoupling may preclude noise-cross-noise latch-up instability from occurring. While stability may be achieved, a compromise to optimally accurate signal estimation may result when the signal-to-noise ratio spread across the branches increases.

If signal images $x_i(t)$ have substantially equivalent signal-to-noise ratios, where the noise of each channel 21 is independent, uncorrelated additive white Gaussian noise, then optimal combining may require that each channel 21a–d contributes equivalently to the correlation reference y'(t). Typically, there is no performance compromise because reference constructor 34 yields an optimal correlation reference y'(t). In this case, small variations in signal-to-noise ratios typically results in only negligible degradation of maximum ratio combining. Larger variations in the signal-to-noise ratios, however, may cause the calculation of signal estimates $M_i$ of a signal image $x_i(t)$ with a low signal-to-noise ratio to have a higher than actual signal magnitude estimate. Conversely, a signal estimate of image $x_i(t)$ with a high signal-to-noise ratio may have a lower than actual magnitude estimate.

Accordingly, since this signal estimate accuracy compromise is predictable, a compensation function P(M) may be used to substantially extend the range of accurate signal magnitude estimates when the signal-to-noise ratio spread becomes large. The compensation function P(M) may be employed that takes advantage of the predictable relationship between a large signal-to-noise ratio spread and the resulting compression of signal estimates $M_i$.

A compensation function P(M) may comprise a multiplicative quadratic or parabolic function that increases the weight spread as the signal-to-noise ratios spread between signal images $x_i(t)$ increases. An example of a weight calculator with an embedded compensation function is given by the following equation:

$$W_i = \frac{M_i}{C^2 - M_i^2} P(M_i)$$

The compensation function P(M) may be embedded in a lookup table implementation of weight calculator 60a–d along with an $S/N^2$ function or may be calculated by independent computation.

Other methods for compensating for the compromise to signal estimate accuracy resulting from stability enhancement, however, may be used. For example, a portion of the combined signal output y(t) may be additively included in the correlation reference y'(t). Multipliers 82 and 84, in conjunction with adder 86, combine the output of reference constructor 80 with the combined signal output y(t). The proportion of each contribution is determined by $K_1$, where $0<K_1<1$. Since the combined signal output y(t) may have the benefit of substantially maximal ratio weighting, the signal-to-noise ratio of combined signal output y(t) may be higher than that of the output of reference constructor 80, which uses equal weight summation. The signal-to-noise ratio of correlation reference y'(t) may be improved, so the accuracy of the signal estimates at a given signal-to-noise ratio spread may also be improved. Accordingly, the inaccuracy in signal estimates caused by stability enhancement may be compensated for by additively including a portion of the combined-signal output, y(t) to the correlation reference y'(t). Depending on the specific application, this compensation method may improve signal estimate accuracy when there is a large signal-to-noise ratio spread across $x_i(t)$ without substantially reintroducing noise-cross-noise instability.

Another example of a method for compensating for signal estimate inaccuracy introduced by stability enhancement is by using bandpass feedback filter 86, which may reduce the noise power component in correlation reference y'(t). The bandwidth of the bandpass feedback filter 86 may be set wide enough to pass substantially all of the signal content, while rejecting a significant portion of the noise component. With less noise in the correlation reference y'(t), the probability of the occurrence of the noise-cross-noise instability may be decreased. Optimization procedures may be used to limit the bandwidth of bandpass feedback filter 86 to reduce the degree to which a signal image $x_i(t)$ correlates with itself in correlation reference y'(t).

To summarize, reference stabilizer 34 may be employed to preclude the noise-cross-noise latch-up instability, which may reduce the accuracy of signal magnitude estimates if the spread of signal-to-noise ratios is large across the signal images $x_i(t)$. To reduce the inaccuracy of the signal magnitude estimates, one or more of the following features may be used. First, a compensation function $P(M_i)$ may be used. Second, $K_1$ may be adjusted such that $0<K_1<1$. Third, the bandwidth of bandpass feedback filter 86 may be adjusted to reduce the noise component in the correlation reference y'(t). The one or more features may be adjusted to deliver desired performance.

Additional or alternative procedures for reducing noise-cross-noise latch-up, however, may be used. For example, reference constructor 80 may be used independently of the other components of reference stabilizer 34 to reduce noise-cross-noise latch-up. As an example, bandpass feedback filter 86 may be omitted.

Figure 4:
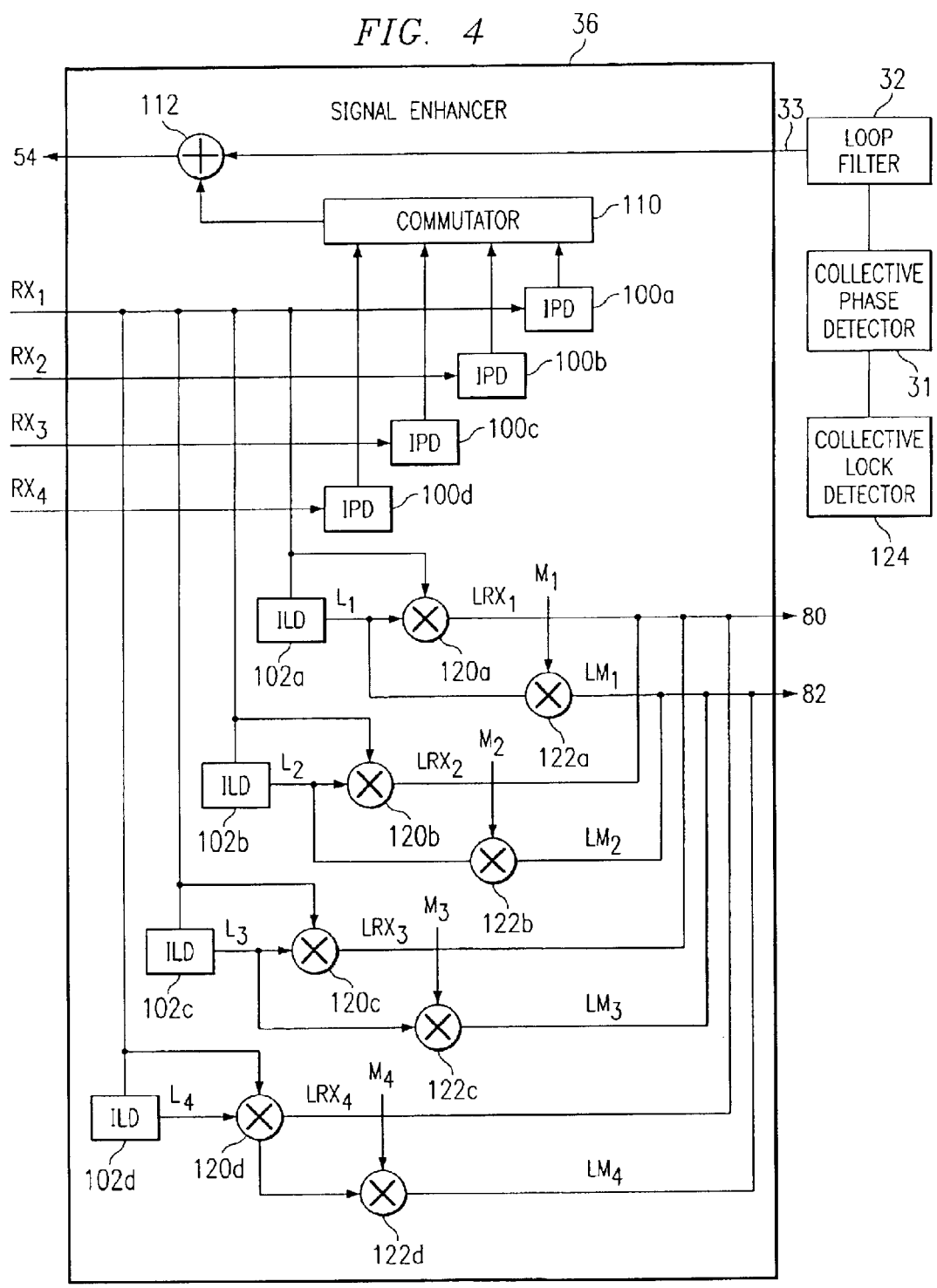
FIG. 4 is a block diagram illustrating one embodiment of the signal enhancer of FIG. 1.

FIG. 4 is a block diagram illustrating one embodiment of signal enhancer 36 of FIG. 1. Signal enhancer 36 allows system 10 to acquire a signal image $x_i(t)$ from predominantly one channel 21, when there is substantially no signal energy at the other channels 21a–d. If signal energy exists at one channel 21a–d but not at other channels 21, the signal energy at the channels 21a–d is mutually uncorrelated, that is, there is no mutual correlation across two or more channels 21a–d. As a result, the signal energy may not be discernable from the noise energy, regardless of the signal-to-noise ratio at the channel 21a–d with the signal energy, thereby possibly precluding acquisition of the signal image $x_i(t)$ at the channel 21a–d without supplemental processing.

Signal enhancer 36 is used to discern signal energy from noise energy to allow for acquisition of a signal image $x_i(t)$ at a single channel 21a–d. In general, signal enhancer 36 determines that the signal energy at a channel 21a–d predominates, and adjusts the correlation reference y'(t) to achieve a collective lock to the signal image $x_i(t)$ at the channel 21a–d. Signal enhancer 36 includes individual phase detectors (IPDs) 100a–d and individual lock detectors (ILDs) 102a–d. Individual phase detectors 100a–d adjust combined signal output y(t) in response to the signal energy detected at channels 21, and individual lock detectors 102a–d adjust the correlation reference y'(t) in response to signal energy detected at channels 21a–d.

According to one embodiment, individual phase detectors 100a–d sequentially emphasize the contribution of a channel 21a–d to carrier recovery loop 33, and initiate a quasi-lock if there is some signal modulation at a given channel 21a–d. An individual phase detector 100a–d may have a dwell period of, for example, approximately tens of milliseconds, which may be optimized for a given mode rate network. A commutator 110 sequentially switches the inputs received from individual phase detectors 100a–d to generate an output received by a summing node 112. Summing node 112 sums the output of commutator 110 with the combined signal output y(t) received from carrier recovery loop 33.

An individual lock detector 102a–d detects the signal energy at a channel 21a–d and outputs an emphasis coefficient $L_i$ in accordance with the detected signal energy. Emphasis coefficient $L_i$ may be defined in any suitable manner. For example, emphasis coefficient $L_i$ may be defined such that if the signal energy at a channel 21a–d has at least a threshold energy level, then the emphasis coefficient $L_i$ increases the contribution of the channel 21a–d to correlation reference y'(t). The contribution may be increased such that the channel 21a–d contributes more than an equal share to correlation reference y'(t). As an example, correlation reference y'(t) may be generated from a 90% contribution from the channel 21a–d that satisfies the threshold energy level and a 10% contribution from the channels 21a–d that do not satisfy the threshold energy level. As a result, the channel 20a–d with greater signal energy contributes more to correlation reference y'(t). If there is a small amount of signal energy at the other channels 21, that energy may still contribute to correlation reference y'(t).

A multiplier 120a–d combines the emphasis coefficient $L_{-i}$ with the adjusted signal image $Rx_i$ to yield $LRx_i$, which is received by reference constructor 80. Multiplier 122a–d combines the emphasis coefficient $L_i$ with a signal magnitude estimate $M_i$ to yield $LM_i$, which is sent to multiplier 82. Reference stabilizer 34 uses $LRx_i$ and $LM_i$ to generate correlation reference y'(t). In summary, correlation reference y'(t) comprises combined signal output y(t), modified by adding the output from reference constructor 80 where an emphasis factor $L_i$ is used as a weight to increase the contribution from a branch in accordance with signal energy detected at each channel 21a–d.

Signal enhancer 36 acts to increase the signal-to-noise ratio of the correlation reference y'(t), thus increasing the accuracy of the signal magnitude estimates $M_i$. The resulting increase in accuracy compensates for the decrease in accuracy of the signal magnitude estimates $M_i$ introduced by the reference stabilizer 34. Signal enhancer 36 may operate in conjunction with collective lock detector 124 to acquire a single signal image as described below, or may be employed to increase the signal-to-noise ratio of the correlation reference y'(t) without using carrier recovery loop 33.

Collective carrier recovery loop 33 acts in conjunction with signal enhancer 36 to acquire a single signal and resolve its frequency error to baseband. A collective lock detector 124 detects the signal energy of combined signal output y(t). If signal energy of a sufficient signal-to-noise ratio is detected, collective lock detector 124 drives carrier recovery loop 33 to trigger the loop bandwidth reduction process. According to one embodiment, if a collective carrier lock is detected, individual phase detectors 100a–d are suspended, but individual lock detectors 102a–d continue to adjust the contribution of the channels 21a–d.

Other methods of acquiring a signal from predominantly one channel 21, however, may be used. For example, signal enhancer 36 may comprise signal multipliers 120a–d and 122a–d and signal detectors located approximately where individual lock detectors 102a–d are located. The signal detectors may use an appropriate form of spectral analysis to detect expected signal energy. The signal detector that detects the expected signal energy at a channel 21a–d increases the contribution of the channel 21a–d used in the generation of correlation reference y'(t).

In operation, signal energy may appear at a single channel 21, for example, channel 21a. Individual lock detector 102a detects the signal energy at channel 21a and outputs an emphasis factor $L_i$ that emphasizes the contribution of channel 21a in the generation of correlation reference y'(t). A signal image $x_i(t)$ within a set of signal images $x_i(t)$ of channel 21a that has significant signal energy correlates strongly with its own signal image $x_i(t)$ in correlation reference y'(t), causing the signal energy of channel 21a to dominate in combined signal output y(t). Subsequently, collective lock detector 124, while operating on the combined signal output y(t), detects the modulation of combined signal output y(t) and triggers the bandwidth reduction process. Accordingly, if there is signal energy at channel 21a, system 10 is capable of locking to that single channel 21a.

As the signal energy increases at one or more of the other channels 21b–d, the increased signal energies correlate with the signal energies of correlation reference y'(t). As the signal energy continues to increase at the other channels 21b–d, individual lock detectors 102a–d eventually detect signal energies that meet the threshold energy level, and output emphasis factors $L_i$ that increase the contributions from the other channels 21b–d used to generate correlation reference y'(t). If the signal energies of channels 21a–d meet the threshold energies, individual lock detectors 102a–d output emphasis factors $L_i$ that result in substantially equivalent contributions from channels 21a–d.

If the signal energy at a channel 21a decreases below the threshold energy level, the contribution from the degrading channel 21a is reduced and thereby is prevented from degrading correlation reference y'(t). The signal energy from the channel 21a, however, may still correlate with the signal energy in correlation reference y'(t) contributed by the other channels 21b–d, and therefore may make an appropriately weighted contribution to combined signal output y(t).

In summary, an embodiment of this invention may involve signal enhancer 36 and reference stabilizer 34, where signal enhancer 36 contributes to increasing the signal-to-noise of the correlation reference y'(t) when the signal-to-noise ratio across the set of signal images $x_i(t)$ is large.

FIG. 5 is a flowchart illustrating one embodiment of a method for combining signals. The method begins at step 200, where signal images $x_i(t)$ are received from receiver channels 20a–d. Complex multipliers 22a–d correlate signal images $x_i(t)$ with a correlation reference y'(t) to generate phasors $r_i$ at step 202. The correlation of signal images $x_i(t)$ with correlation reference y'(t) removes signal modulation. Phase-locked looped circuits 24a–d filter phasors $r_i$ to generate unity magnitude phasors $R_i$ that have frequencies and phases that match those of phasors $r_i$ at step 204. Complex multipliers 26a–d apply unity magnitude phasors $R_i$ to signal images $x_i(t)$, adjusting the phase alignment of $R_1\alpha_i d$(t), to yield adjusted signal images $Rx_i(t)$ at step 206.

Estimation filters 28a–d determine signal magnitude estimates $M_i$ from phasors $r_i$ at step 208. Signal magnitude estimates $M_i$ may provide accurate estimates of the signal content of signal images $x_i(t)$. Weight calculators 60a–d calculate weights $W_i$ from signal magnitude estimates $M_i$ at step 210. Each weight $W_i$ reflects the signal-to-noise ratio associated with the corresponding signal image $x_i(t)$, allowing system 10 to avoid the requirement that signal images $x_i(t)$ must be matched with respect to gain and noise.

Scalar multipliers 62a–d apply weights $W_i$ to adjusted signal images $Rx_i(t)$, and summing node 64 combines the weighted adjusted signal images $WRx_i(t)$ to yield a weighted sum $Sum_A(t)$ at step 212. A normalization factor $G_{out}$ is calculated from the signal magnitude estimates $M_i$ and the weights $W_i$ at step 214. A multiplier 72 normalizes the weighted sum $Sum_A(t)$ at step 216 by applying the normalization factor $G_{out}$ to the weighted sum $Sum_A(t)$ in order to yield a combined signal output y(t). The combined signal output y(t) is output at step 218.

Carrier recovery loop 33 resolves the combined signal output y(t) to baseband at step 219. Signal enhancer 36 determines the contribution of channels 21a–d to the correlation reference y'(t) at step 220. Signal enhancer 36 may adjust the correlation reference y'(t) such that channels 21a–d with a higher signal energy provide a greater contribution to the correlation reference y'(t). Reference stabilizer 34 stabilizes the combined signal output y(t) in accordance with the signal magnitude estimates $M_i$ at step 222 in order to avoid noise-cross-noise latch-up. Reference stabilizer 34 generates a correlation reference y'(t) from the combined signal output y(t) according to the determined contribution of channels 21a–d at step 224.

At 226, system 10 determines whether the next signal images $x_i(t)$ have been received. If no next signal images $x_i(t)$ have been received, the method terminates. If next signal images $x_i(t)$ have been received, the method returns to step 202, where the next signal images $x_i(t)$ are correlated with the correlation reference y'(t) determined at step 224. As may be understood to one skilled in the art, some steps of the method may be performed in a different order. Additionally, some steps of the method may be performed simultaneously.

Certain embodiments of the invention may provide one or more technical advantages. A technical advantage of one embodiment may be that signal images are combined in accordance with the signal-to-noise ratios associated with each signal image. Accordingly, the signal images are not required to be matched with respect to gain and noise in order to be optimally combined.

Another technical advantage of one embodiment may be that procedures that typically improve signal-to-noise ratios such as phase alignment and signal weighting occur independently of carrier recovery. Accordingly, carrier recovery may benefit from improved signal-to-noise ratios in order to enhance carrier acquisition.

Although the present invention has been described in several embodiments, various changes and modifications may be suggested to one skilled in the art. It is intended that the present invention encompass such changes and modifications as fall within the scope of the appended claims.

What is claimed is:

1. A method for combining signal images, comprising:

receiving a plurality of signal images;

performing the following for at least one signal image of the signal images to yield a weighted sum for at least one signal image of the signal images:

generating a phasor from a signal image in accordance with a correlation reference;

adjusting a phase alignment of the signal image to yield an adjusted signal image;

determining a signal magnitude estimate in accordance with the phasor;

determining a weight in accordance with the signal magnitude estimate, the weight reflecting a signal-to-noise ratio associated with the signal image; and applying the weight to the adjusted signal image to yield a weighted sum associated with the signal image; and combining the weighted sums associated with the signal images to yield a combined signal output.

2. The method of claim 1, further comprising:

generating a next correlation reference in accordance with the combined signal output; and determining a next phasor of a next iteration by correlating a next signal image of the next iteration with the next correlation reference.

3. The method of claim 1, further comprising:

resolving the combined signal output to a baseband; and determining a unity magnitude phasor of a next iteration in accordance with a next phasor and the resolved combined signal output.

4. The method of claim 1, wherein determining a signal magnitude estimate in accordance with the phasor comprises:

determining a real component associated with the phasor; and determining the signal magnitude estimate in accordance with the real component.

5. The method of claim 1, wherein adjusting a phase alignment of the signal image to yield an adjusted signal image comprises:

generating a unity magnitude phasor in accordance with the signal image;

applying the unity magnitude phasor to the signal image to yield the adjusted signal image.

6. The method of claim 1, further comprising generating a next correlation reference in accordance with the combined signal output by:

detecting a signal energy associated with each signal image of the signal images;

determining a contribution of each signal image of the signal images in accordance with the detected signal energies; and generating the next correlation reference from the combined signal output in accordance with the determined contributions.

7. The method of claim 1, further comprising generating a next correlation reference in accordance with the combined signal output by:

adjusting the signal magnitude estimates in accordance with the signal-to-noise ratios associated with the signal images; and generating the next correlation reference from the combined signal output in accordance with the adjusted signal magnitude estimates.

8. The method of claim 1, further comprising normalizing the combined signal output by:

calculating a normalization factor according to the weights and the signal magnitude estimates; and applying the normalization factor to the combined signal output to normalize the combined signal output.

9. A system for combining signal images, comprising:

a plurality of receiver channels, each receiver channel operable to receive a plurality of signal images;

a plurality of channel branches, each channel branch coupled to a receiver channel and operable to perform the following for a signal image of the signal images to yield a weighted sum for the signal image:

generate a phasor from the signal image in accordance with a correlation reference;

adjust a phase alignment of the signal image to yield an adjusted signal image;

determine a signal magnitude estimate in accordance with the phasor;

determine a weight in accordance with the signal magnitude estimate, the weight reflecting a signal-to-noise ratio associated with the signal image; and apply the weight to the adjusted signal image to yield the weighted sum associated with the signal image; and a summing node coupled to the channel branches and operable to combine the weighted sums associated with the signal images to yield a combined signal output.

10. The system of claim 9, further comprising a reference generator coupled to the summing node and operable to generate a next correlation reference in accordance with the combined signal output, a channel branch being operable to determine a next phasor of a next iteration by correlating a next signal image of the next iteration with the next correlation reference.

11. The system of claim 9, further comprising a carrier recovery loop coupled to the summing node and operable to:

resolve the combined signal output to a baseband; and determine a unity magnitude phasor of a next iteration in accordance with a next phasor and the resolved combined signal output.

12. The system of claim 9, wherein a channel branch operates to determine a signal magnitude estimate in accordance with the phasor by:

determining a real component associated with the phasor; and determining the signal magnitude estimate in accordance with the real component.

13. The system of claim 9, wherein a channel branch operates to adjust a phase alignment of the signal image to yield an adjusted signal image by:

generating a unity magnitude phasor in accordance with the signal image; and applying the unity magnitude phasor to the signal image to yield the adjusted signal image.

14. The system of claim 9, further comprising a reference generator coupled to the summing node and operable to generate a next correlation reference in accordance with the combined signal output by:

detecting a signal energy associated with each signal image of the signal images;

determining a contribution of each signal image of the signal images in accordance with the detected signal energies; and generating the next correlation reference from the combined signal output in accordance with the determined contributions.

15. The system of claim 9, further comprising a reference generator coupled to the summing node and operable to generate a next correlation reference in accordance with the combined signal output by:

adjusting the signal magnitude estimates in accordance with the signal-to-noise ratios associated with the signal images; and generating the next correlation reference from the combined signal output in accordance with the adjusted signal magnitude estimates.

16. The system of claim 9, further comprising a sum-weight module coupled to the summing node and operable to normalize the combined signal output by:

calculating a normalization factor according to the weights and the signal magnitude estimates; and applying the normalization factor to the combined signal output to normalize the combined signal output.

17. A method for combining signal images, comprising:

means for receiving a plurality of signal images;

means for performing the following for at least one signal image of the signal images to yield a weighted sum for at least one signal image of the signal images by:

generating a phasor from a signal image in accordance with a correlation reference;

adjusting a phase alignment of the signal image to yield an adjusted signal image;

determining a signal magnitude estimate in accordance with the phasor;

determining a weight in accordance with the signal magnitude estimate, the weight reflecting a signal-to-noise ratio associated with the signal image; and applying the weight to the adjusted signal image to yield a weighted sum associated with the signal image; and means for combining the weighted sums associated with the signal images to yield a combined signal output;

means for generating a next correlation reference in accordance with the combined signal output; and means for determining a next phasor of a next iteration by correlating a next signal image of the next iteration with the next correlation reference.

18. A system for combining signal images, comprising:

a plurality of receiver channels operable to receive a plurality of signal images;

a plurality of channel branches, each channel branch coupled to a receiver channel and operable to perform the following for a signal image of the signal images to yield a weighted sum for the signal image:

generate a phasor from the signal image in accordance with a correlation reference;

adjust a phase alignment of the signal image to yield an adjusted signal image by generating a unity magnitude phasor in accordance with the signal image, and applying the unity magnitude phasor to the signal image to yield the adjusted signal image;

determine a signal magnitude estimate in accordance with the phasor by determining a real component associated with the phasor, and determining the signal magnitude estimate in accordance with the real component;

determine a weight in accordance with the signal magnitude estimate, the weight reflecting a signal-to-noise ratio associated with the signal image; and apply the weight to the adjusted signal image to yield the weighted sum associated with the signal image; and a summing node coupled to the channel branches and operable to combine the weighted sums associated with the signal images to yield a combined signal output;

a reference generator coupled to the summing node and operable to generate a next correlation reference in accordance with the combined signal output by detecting a signal energy associated with each signal image of the signal images and determining a contribution of each signal image of the signal images in accordance with the detected signal energies, adjusting the signal magnitude estimates in accordance with the signal-to-noise ratios associated with the signal images, and generating the next correlation reference from the combined signal output in accordance with the determined contributions and with the adjusted signal magnitude estimates, a channel branch being operable to determine a next phasor of a next iteration by correlating a next signal image of the next iteration with the next correlation reference;

a carrier recovery loop coupled to the summing node and operable to resolve the combined signal output to a baseband, and determine a unity magnitude phasor of the next iteration in accordance with the next phasor and the resolved combined signal output; and a sum-weight module coupled to the summing node and operable to normalize the combined signal output by calculating a normalization factor according to the weights and the signal magnitude estimates, and applying the normalization factor to the combined signal output to normalize the combined signal output.

* * * * *

UNITED STATES PATENT AND TRADEMARK OFFICE
CERTIFICATE OF CORRECTION

PATENT NO. : 6,801,867 B2
APPLICATION NO. : 10/219128
DATED : October 5, 2004
INVENTOR(S) : George P. Bortnyk It is certified that error appears in the above-identified patent and that said Letters Patent is hereby corrected as shown below:

Column 1:
At Line 9, after "COMBINING." insert a new paragraph, centered -- GOVERNMENT FUNDING --.

Column 2:
Line 5, after "are" delete "a."

Column 5:
At Line 46, Equation 4, $$\sum_i W_i R_i' n_i'(t) +$$

delete $$\text{``} \sum_i \text{''}$$

and insert -- $\Sigma$ --.

At Line 49, Equation 4, $$\sum_i W_i R_i' n_i'(t) +$$

after "R" delete "*".

Column 7:
Line 32, after "where" delete "$0<K_1<1.$" and insert -- $0 \leq K_1 \leq 1.$ --.

Column 8:
At Line 61, after "that" delete "$0<K_1<1.$" and insert -- $0 \leq K_1 \leq 1.$ --.

Column 9:
At Line 63, delete "$L_{-i}$" and insert -- $L_i$ --.

UNITED STATES PATENT AND TRADEMARK OFFICE
CERTIFICATE OF CORRECTION

PATENT NO. : 6,801,867 B2
APPLICATION NO. : 10/219128
DATED : October 5, 2004
INVENTOR(S) : George P. Bortnyk It is certified that error appears in the above-identified patent and that said Letters Patent is hereby corrected as shown below:

Column 11:
Line 24, delete "$R_1\alpha_i d(t)$" and insert -- $R_i\alpha_i d(t)$ --.

Signed and Sealed this

Fourth Day of March, 2008

JON W. DUDAS
*Director of the United States Patent and Trademark Office*